United States Patent [19]

Kleinknecht

[11] Patent Number: 5,457,216
[45] Date of Patent: Oct. 10, 1995

[54] A-TOCOPHEROL PREPARATION

[75] Inventor: Harald Kleinknecht, Alzey, Germany

[73] Assignee: Rhein Chemie Rheinau GmbH, Mannheim, Germany

[21] Appl. No.: 225,561

[22] Filed: Apr. 11, 1994

[30] Foreign Application Priority Data

Apr. 21, 1993 [DE] Germany .......................... 43 12 992.7

[51] Int. Cl.⁶ .................................................. C07D 311/00
[52] U.S. Cl. ............................................ 549/408; 524/110
[58] Field of Search ............................. 549/408; 524/110

[56] References Cited

U.S. PATENT DOCUMENTS 5,308,549  3/1994  Laermer et al. ...................... 524/110

FOREIGN PATENT DOCUMENTS 53-134574  11/1978  Japan .

*Primary Examiner*—José G. Dees
*Assistant Examiner*—Dwayne C. Jones
*Attorney, Agent, or Firm*—Connolly & Hutz

[57] ABSTRACT

An α-tocopherol preparation is disclosed which contains 40 to 80% by weight tocopherol, 10 to 40% by weight EPM rubber and 10 to 50% by weight neutral silicate filler or acrylate polymer. The composition is added during vulcanization of rubber to inhibit nitrosamine formation.

2 Claims, No Drawings

A-TOCOPHEROL PREPARATION

FIELD OF THE INVENTION

α-Tocopherol (vitamin E) is a known inhibitor for the formation of nitrosamines in the vulcanization of rubber. However, its practical application is complicated by the fact that it is highly viscous and is difficult to incorporate.

BACKGROUND OF THE INVENTION

It is also known that rubber chemicals can be mixed with binders and thus converted into an easy-to-handle form. Binders for powder-form rubber chemicals are, for example, diene polymers, even in admixture with other polymeric dispersants and, optionally, plasticizing oils. Binders for liquid rubber chemicals are also known. They correspond to the binders used for powder-form chemicals, but additionally contain highly active mineral powders which ensure that the mixture is solid. However, it is only possible in this way to achieve low concentrations of active substance.

The inhibiting effect of α-tocopherol on the formation of nitrosamines only occurs under certain conditions. For example, it is prevented by the presence of basic substances. Salts are formed at the phenolic OH of the tocopherol, thus eliminating its effect. In the presence of acidic substances, not only is the inhibiting effect eliminated, the formation of nitrosamine is actually catalyzed and intensified. In aqueous medium, this occurs at pH values below 6.4.

SUMMARY OF THE INVENTION

It has been found that a mixture of α-tocopherol, a special EPM rubber and either a special neutral silicate filler or a special acrylate polymer acts as an easy-to-use nitrosamine inhibitor and is also fully effective. The mixture according to the invention consists of 40 to 80% by weight α-tocopherol, 10 to 40% by weight EPM rubber (ethylene propylene rubber), 10 to 50% by weight neutral silicate filler or acrylate polymer. The EPM rubber may also be a mixture of EPM rubber and 0 to 20% by weight of an EPDM rubber (ethylene propylene diene monomer rubber). The mixture preferably consists of 50 to 80% by weight α-tocopherol, 20 to 40% by weight EPM rubber and 10 to 50% by weight silicate filler or acrylate polymer.

DESCRIPTION OF THE PREFERRED EMBODIMENTS

The special EPM rubber suitable for use in accordance with the invention has the following composition: 40% ethylene content; very broad molecular weight distribution. The EPM rubber is commercially available under the name of VISTALON 404. An EPDM rubber containing 30 to 40% ethylene and 2 to 6% ethylene norbornene may be added to this rubber. The EPDM rubber is commercially available as BUNA AP 447. The special silicate has the following characteristics: BET surface 450, pH value of a 50% aqueous dispersion 7. The silicate is commercially available under the name of SUPERNAT 50. The acrylate polymer contains a cross-linked alkyl acrylate polymer as base polymerized onto the side chains of resin-forming monomers (methyl methacrylate). The acrylate polymer preferably has a density of 1.06 and a melting temperature of 132° to 149° C. It is commercially available as PARALOID KM 232 B (Rohm & Haas).

The mixture according to the invention may be prepared by mixing the constituents in known manner. It may be added to rubber mixtures preferably in quantities of 0.5 to 3 phr (parts per 100 rubber) in which it prevents the formation of nitrosamines from secondary amines present in the mixture or secondary amines in the course of formation.

EXAMPLES

The following mixtures were prepared by mixing the constituents in an internal kneader.

TABLE 1

| Mixture | 1 | 2 | 3 | 4 | 5 |
| --- | --- | --- | --- | --- | --- |
| α-Tocopherol, parts by weight | 50 | 50 | 80 | 66.6 | 70 |
| Vistalon 404, parts by weight | 20 | 16.7 | 12 | 5.2 | — |
| Sipernat 50, parts by weight | 28 | 33.3 | 28 | 16 | — |
| Paraloid KM 232B, parts by weight | — | — | — | 10.3 | 28 |
| Buna AP 447, parts by weight | — | — | 2 | — | — |

Application
A rubber mixture was prepared from:

|  | Parts by weight |
| --- | --- |
| Butadiene/styrene copolymer rubber (Mooney viscosity ML 4' 50–52) | 75 |
| Natural rubber (Mooney viscosity ML 4' 50) | 25 |
| Carbon black N 550 | 50 |
| Zinc salt of saturated and unsaturated fatty acids | 3 |
| Aromatic oil | 10 |
| Sulfur | 1 |
| Tetramethyl thiuram disulfide | 1.3 |
| Benzothiazyl sulfene morpholide | 1.7 |

During vulcanization, the mixture was found to contain:
N-nitrodimethyl amine 9240 μg/kg
N-nitrosomorpholine 11450 μg/kg The test was then repeated with addition of 3 parts by weight of mixture 1 from Table 1 before vulcanization. The mixture was found to contain:
N-nitrodimethyl amine 1390 μg/kg
N-nitrosomorpholine 1080 μg/kg,
i.e. reductions of 85% and 90% respectively.

I claim:

1. A composition for inhibiting the formation of nitrosamines during rubber vulcanization, the composition comprising 40 to 80% by weight α-tocopherol, 10 to 40% by weight ethylene propylene rubber, and 10 to 50% by weight of neutral silicate filler or an acrylate polymer.

2. The preparation of claim 1, wherein the ethylene propylene rubber contains up to 20% by weight of ethylene propylene diene monomer rubber.

* * * * *